United States Patent Office 3,558,502
Patented Jan. 26, 1971

3,558,502
CHEMILUMINESCENT PROCESS
Alfred F. Tatyrek, Maplewood, and Burton Werbel, West Orange, N.J., assignors to the United States of America as represented by the Secretary of the Army
No Drawing. Filed Nov. 7, 1967, Ser. No. 681,113
Int. Cl. C09k 1/02, 3/00
U.S. Cl. 252—186                    18 Claims

ABSTRACT OF THE DISCLOSURE

In a process of producing light by a tetrakis (dimethylamino) ethylene and oxygen reaction, the improvement of adding an alkali metal, metallic alkyl or metallic hydride thereto to increase the total light output thereof.

This invention relates to the improved chemiluminescence of tetrakis (dimethylamino) ethylene. More particularly, this invention relates to means for increasing the chemiluminescent yield of tetrakis (dimethylamino)ethylene.

Tetrakis (dimethylamino) ethylene is known to undergo autooxidation which is accompanied by a strong chemiluminescence in the blue-green region of the spectrum. This occurs when such compound is exposed to the oxygen in the air while in the presence of a proton donor. The oxidation products of this compound include tetramethyl urea, which has been also known to quench the chemiluminescence of the reaction. This usually occurs because of the transfer of energy, from the excited molecules of tetrakis (dimethylamino) ethylene to the molecules of tetramethyl urea, which is then lost as heat rather than light. A second major loss of light is thought to be due to absorption by a complex formed between the above two compounds besides the absorption of the monocation of the tetrakis (dimethylamino) ethylene. The loss of chemiluminescent energy has been reported to reduce the light yield to fifty percent when only two percent by weight of tetramethyl urea has been formed by the autooxidation of tetrakis (dimethylamino)ethylene.

In the past, in order to improve the chemiluminescent process, the oxidation products of tetrakis (dimethylamino) ethylene were removed by water extraction techniques. However, this is a batch type purification which will require quite a great deal of development to adopt it to present-day needs.

The subject invention answers the needs of the art with special emphasis on the increasing of the light yield of the chemiluminescent process.

It is an object of this invention to provide novel means for improving the chemiluminescent process of tetrakis (dimethylamino) ethylene.

Another object is to provide novel additives for use in increasing the yield of the chemiluminescent process of tetrakis (dimethylamino) ethylene.

Other objects and many of the attendant advantages of this invention will be readily appreciated as the same becomes better understood by reference to the following detailed description.

We have now discovered that if one of a specified series of additives is added to the chemiluminescent process of tetrakis (dimethylamino) ethylene, a higher yield of light will be generated by the process. This is done by removal of the oxidation products of tetrakis (dimethylamino) ethylene. This may be accomplished on a continuous basis by a chemical reduction of tetramethyl urea through the use of alkali metals, metal hydrides, and metallic alkyls. It was found that all other reducing agents experimentally tested were not capable of lowering the quenching action of tetramethyl urea on chemiluminescense of tetrakis (dimethylamino) ethylene. It is thought that tetramethyl urea will be reduced to volatile amines, probably to bis (dimethylamino) methane, which will not have a quenching effect on the light yield of the chemiluminescent process.

The metals which may be used in the form of dispersions to improve the chemiluminescent process include sodium, lithium, potassium, and cesium. They should be used in an amount by weight of between about 0.1 and 7 percent. Below 0.1 percent, the addition is ineffective in improving the process and above 7 percent, the reaction process becomes extremely hazardous to carry out. The use of about 2 percent by weight was found to give optimum improvement to the chemiluminescent process. For instance, a 2 percent by weight sodium dispersion having an average particle size of about 12 microns was found effective in selectively destroying the tetramethyl urea in a tetrakis (dimethylamino) ethylene medium and the resulting formulation was found to have enhanced chemiluminescent performance.

The following is an example of the utilization of one of the above metals in the preparation of a formulation for the chemiluminescent process.

EXAMPLE I

Formulation:                                    Grams
    Sodium (metallic) _____ 2
    Paraffin wax _____ 48
    Tetrakis (dimethylamino) ethylene _____ 50

In an inert atmosphere of nitrogen free of moisture and oxygen, sodium and paraffin wax were melted in a high speed blender. After the latter two ingredients were melted, the blender was activated and a dispersion was formed consisting of sodium in the melted wax. At this point in the process, tetrakis (dimethylamino) ethylene was added to the mass accompanied by high speed stirring. As the mass begin to solidify, stirring was discontinued. The resultant formulation exhibit improved chemiluminescent performance after processing.

The metallic hydrides which may be used in the process to improve light yield include lithium aluminum hydride, lithium aluminum tri (tertiary butoxy) hydride, dimethylamine borohydride, tertiarybutylamine borohydride, and dimethylamino aluminum borohydride. The addition of 5 percent of a stoichiometric reacting equivalent of metallic hydride to the tetrakis (dimethylamino) ethylene should increase the total light yield by almost 125 percent.

In the following table, the formulas are given for the hydrides which had the ability to destroy or reduce the tetramethyl urea oxidation products of tetrakis (dimethylamino) ethylene with a resulting increase in chemiluminescent light.

TABLE I

| Compound | Formula | Molecular weight |
| --- | --- | --- |
| Lithium aluminum hydride | $LiAlH_4$ | 37.94 |
| Lithium aluminum tri-tertiary butoxy hydride | $LiAl(t-OBa)_3H$ | 254 |
| Dimethylamine borohy dride | $(CH_3)_2HNBH_3$ | 58.9 |
| t-Butylamine borohydride | $(C_4H_9)NH_2BH_3$ | |
| Dimethylamino aluminum borohydride (Hybaline A-5) | $(CH_3)_2NH:AlB_3H_{12}$ | 109.19 |
| Sodium dispersions | Na | 23 |

Although all of the above compounds reacted with tetramethyl urea, there was no reaction with tetrakis (dimethylamino) ethylene even above room temperature. The dimethylamino aluminum borohydride was found to be the most efficient selective reactant for the process. In chemiluminescent formulations using this material, no fire problem was encountered since the concentration of such material is kept relatively low and the concentration of tetramethyl urea is very low, at any specific time, due to the fact that it is destroyed as fast as it is formed.

Examples 2 and 3, which follow, illustrate the preferred method of utilizing metallic hydrides to increase the yield of light from the chemiluminescent process.

EXAMPLE 2

Formulation: Amounts, grams
(1) Paraffin wax _____ 45
(2) Tetrakis (dimethylamino) ethylene _____ 50
(3) Dimethylamino aluminum borohydride ____ 5

The paraffin wax is melted in a 250 cc. beaker under inert atmosphere such as nitrogen which is free of oxygen and moisture. At this point in the process, tetrakis (dimethylamino) ethylene is added to the beaker accompanied by rapid stirring. Heating is discontinued and dimethylamino aluminum borohydride is then added to the mass. A suspension of the latter compound in the wax and tetrakis (dimethylamino) ethylene is produced by continuing rapid stirring. As the formulation solidifies, stirring is discontinued. The resulting mass exhibited improved chemiluminescent performance.

EXAMPLE 3

Formulation: Amounts, grams
(1) White mineral oil _____ 34
(2) Lithium aluminum hydride _____ 8
(3) Tetrakis (dimethylamino) ethylene _____ 50
(4) Silica gel _____ 8

The mineral oil is placed in a high speed blender and to it is added the desired amount of lithium aluminum hydride. In view of the fire hazards, the above ingredients are maintained under an inert atmosphere such as nitrogen which is free of oxygen and moisture. The blender is run at a high speed to pulverize the hydride to a fine colloidal or suspended state. At this point in the process, tetrakis (dimethylamino) ethylene is added to the mass with stirring. Subsequently, silica gel is added to stabilize the hydride in the suspended state.

Metallic alkyls, of which triethyl aluminum is a typical example, are comparable in their reducing properties to metallic hydrides. We have discovered that these compounds are also effective in selectively reacting with the oxidation products of tetrakis (dimethylamino) ethylene to improve the chemiluminescent process. They may be added to the tetrakis (dimethylamino) ethylene in an amount between 0.1 and 8 percent by weight. Below this range, they are quite ineffective in the process, and above this range, they are extremely hazardous to handle. The optimum in improvement is achieved at about 5 percent by weight. The metallic alkyls which may be used to advantage in this process include triethyl aluminum-$Al(C_2H_5)_3$, tri (isobutyl) aluminum-$Al(C_4H_9)_3$, trimethyl aluminum-$Al(CH_3)_3$, ethyl aluminum sesquichloride-$(C_2H_5)_3Al_2Cl_3$, diethyl zinc-$Zn(C_2H_5)_2$, and triethyl boron-$B(C_2H_5)_3$.

Metallic alkyls are incorporated in the tetrakis (dimethylamino) ethylene in the following manner.

EXAMPLE 4

Formulation: Grams
(1) Diethyl zinc _____ 5
(2) Tetrakis (dimethylamino) ethylene _____ 50
(3) White mineral oil _____ 45

The above materials were blended together in a nitrogen atmosphere free of moisture and oxygen. The resulting mass was then absorbed into a fiber glass mat. The latter substrate should only be impregnated not saturated with the formulation. Upon exposure to the air, the resultant substrate had improved chemiluminescent performance.

In all cases, it was found that the specified alkali metals, metallic hydrides, and metallic alkyls increased the yield of light from the chemiluminescent reaction.

Obviously, many modifications and variations of the present invention are possible in the light of the above teachings. It is, therefore, to be understood that within the scope of the appended claims, the invention may be practiced otherwise than as specifically described.

We claim:

1. In a process of increasing the total light output of the chemiluminescent reaction achieved by contacting tetrakis (dimethylamino) ethylene with oxygen in the presence of a proton donor to form oxidation products, the improvement therewith, comprising: the step of dispersing in said tetrakis (dimethylamino) ethylene about 0.1 to about 7 percent by weight of an alkali metal, to remove the harmful effect of said oxidation products on the light output of said chemiluminescent reaction.

2. In the process of claim 1 wherein said metal is selected from the group consisting of sodium, lithium, potassium and cesium.

3. In the process of claim 1 wherein said metal is sodium.

4. In the process of claim 1 wherein said metal is lithium.

5. In the process of claim 1 wherein said metal is potassium.

6. In the process of claim 1 wherein said metal is cesium.

7. In a process of increasing the total light output of the chemiluminescent reaction achieved by contacting tetrakis (dimethylamino) ethylene with oxygen in the presence of a proton donor to form oxidation products, the improvement therewith, comprising: the step of dispersing in said tetrakis (diemthylamino) ethylene from about 5 to about 8 percent by weight of a metallic hydride selected from the group consisting of lithium aluminum hydride, lithium aluminum tritertiary butoxy hydride, dimethylamine borohydride, tertiarybutylamine borohydride, and dimethylamino aluminum borohydride to remove the harmful effect of said oxidation products on the light output of said chemiluminescent reaction.

8. In the process of claim 7 wherein said metallic hydride is lithium aluminum hydride.

9. In the process of claim 7 wherein said metallic hydride is lithium aluminum tri-tertiary butoxy hydride.

10. In the process of claim 7 wherein said metallic hydride is dimethylamine borohydride.

11. In the process of claim 7 wherein said metallic hydride is dimethylamino aluminum borohydride.

12. In the process of claim 7 wherein said metallic hydride is tertiary-butylamine borohydride.

13. In a process of increasing the total light output of the chemiluminescent reaction achieved by contacting tetrakis (dimethylamino) ethylene with oxygen in the presence of a proton donor to form oxidation products, the improvement therewith comprising: the step of dispersing in said tetrakis (dimethylamino) ethylene about 0.1 to about 8 percent by weight of a metallic alkyl selected from the group consisting of triethyl aluminum, tri (isobutyl) aluminum, trimethyl aluminum, ethyl aluminum sesquichloride, diethyl zinc and triethyl boron to remove the harmful effect of said oxidation products on the light output of said chemiluminescent reaction.

14. In the process of claim 13 wherein said metallic alkyl is triethyl aluminum.

15. In the process of claim 13 wherein said metallic alkyl is tri-isobutyl aluminum.

16. In the process of claim 13 wherein said metallic alkyl is ethyl aluminum sesquichloride.

17. In the process of claim 13 wherein said metallic alkyl is diethyl zinc.

18. In the process of claim 13 wherein said metallic alkyl is triethyl boron.

References Cited

UNITED STATES PATENTS 3,311,564  3/1967  Cline  252—188.3

JOHN D. WELSH, Primary Examiner

U.S. Cl. X.R.

252—188.3